United States Patent [19]
Joo

[11] Patent Number: 5,956,357
[45] Date of Patent: Sep. 21, 1999

[54] LASER DIODE DRIVING APPARATUS USING ATTENUATED WAVEFORM

[75] Inventor: Seong-Sin Joo, Suwon, Rep. of Korea

[73] Assignee: Samsung Electronics Co., Ltd., Kyungki-do, Rep. of Korea

[21] Appl. No.: 08/921,314

[22] Filed: Aug. 29, 1997

[30] Foreign Application Priority Data

Aug. 30, 1996 [KR] Rep. of Korea ...................... 96-37184

[51] Int. Cl.$^6$ .................................................. G11B 7/125
[52] U.S. Cl. .................................. 372/38; 372/30; 372/33; 369/115; 365/189.01; 365/189.07
[58] Field of Search .................................. 372/38, 25, 29, 372/30, 33; 369/115; 365/189.01, 189.07

[56] References Cited

U.S. PATENT DOCUMENTS 4,945,516  7/1990  Kashiyama ....................... 365/189.05

FOREIGN PATENT DOCUMENTS

| 63-39138 | 2/1988 | Japan | G11B 7/00 |
| 2-58737 | 2/1990 | Japan | G11B 7/125 |
| 4-283437 | 10/1992 | Japan | G11B 11/10 |
| 6-187640 | 7/1994 | Japan | G11B 7/00 |
| 6-208740 | 7/1994 | Japan | G11B 11/10 |
| 6-349065 | 12/1994 | Japan | G11B 7/00 |

*Primary Examiner*—Rodney Bovernick
*Assistant Examiner*—Yisun Song
*Attorney, Agent, or Firm*—Sughrue, Mion, Zinn, Macpeak & Seas, PLLC

[57] ABSTRACT

A laser diode driving apparatus produces a simple write signal having an attenuated waveform to drive the laser diode. A laser diode emits laser light on an optical disk according to a write signal to record data thereon. A laser diode driver outputs a predetermined, plurality of write power values each being different from each other. A write control signal generator calculates widths of a kick pulse and a brake pulse corresponding to the pulse width of the received NRZI signal, and generates write control signals in a predetermined order for controlling write power values corresponding to the calculated widths of the kick pulse and the brake pulse. A write signal generator supplies a write signal to the laser diode using a plurality of the write power values according to the write control signals generated by the write control signal generator. Accordingly, a write domain can be made to be close to a distinct oval. Furthermore, distortion or swing of the reproduced signal can be minimized and a carrier-to-noise ratio can be improved. The laser diode driving apparatus can be easily constructed so that the cost of the set does not increase.

6 Claims, 5 Drawing Sheets

LASER DIODE DRIVING APPARATUS USING ATTENUATED WAVEFORM

BACKGROUND OF THE INVENTION

The present invention relates to a laser diode driving apparatus, and more particularly, to a laser diode driving apparatus for driving a laser diode using a write signal having an attenuated waveform.

Recent recording media for information storage utilize high density to store a larger amount of data than existing recording media do. The kinds of recording media are diversified as well. Among the recording media, a mini disk (MD) or a magneto-optical disk (MOD) uses pits which are formed on the disk using laser light emitted from a laser diode, to record data thereon. Furthermore, the data recorded on the disk is reproduced using such a feature that the intensity of the reflected light is varied according to presence or absence of the pits when laser light emitted from the laser diode is reflected from the disk and returned therefrom.

FIG. 1 is a block diagram of a conventional laser diode driving apparatus. FIGS. 2a through 2f are waveform diagrams of input/output signals of the respective elements shown in FIG. 1. In FIG. 1, a mark edge waveform generator 1 receives write data as shown in FIG. 2a and a reference clock of FIG. 2b. The mark edge waveform generator 1 generates a mark edge waveform shown in FIG. 2c by synchronizing the received write data with the reference clock. The mark edge waveform represents a non-return to zero inverted (NRZI) signal in which the level of the waveform is inverted when a zero ("0") or zeros contained in the write data composed of a binary bit stream of "0" and "1" is changed to other value. A write pulse generator 2 receiving such a NRZI signal generates a write pulse train corresponding to pulse widths of the NRZI signal, as shown in FIG. 2d. The write pulse train is represented as waveform corresponding to a period 2T through 8T of the NRZI signal, in which T corresponds to a period of the reference clock. The write pulse generator 2 supplies the write pulse train to a laser diode driver 3. The laser diode driver 3 makes current flow through a laser diode 4 according to the write pulse train. As a result, a write domain is formed on the disk as shown in FIG. 2e. FIG. 2f is a waveform diagram of a reproduced signal detected from the data recorded on the disk using the laser diode 4.

As described above, a conventional laser diode has been driven using a write pulse train whose T/2 pulse repeats according to pulse widths of the NRZI signal. However, since a pulse width becomes narrow in a disk on which data is recorded at high density, it is not so easy to accurately produce a T/2 pulse. Considering a response time of currently commercialized devices, the structure of a laser diode driving device becomes complicated to accurately produce a T/2 pulse. In addition, the cost of the set increases. Furthermore, since a reproduced signal includes jitter in a high density disk, signal distortion and time-base swing occurs, and a carrier-to-noise ratio is lowered.

SUMMARY OF THE INVENTION

To solve the above problems, it is an object of the present invention to provide a laser diode driving apparatus using an attenuated wave in which a laser diode can be driven by a write signal of a simply attenuated waveform made from a mark edge waveform of write data.

To accomplish the above object of the present invention, there is provided a laser diode driving apparatus, using a non-return-to-zero-inverted (NRZI) signal of write data, that includes a laser diode for emitting laser light on an optical disk according to a write signal to record data thereon; a laser diode driver for generating a predetermined, plurality of write power values each being different from each other; a write control signal generator for calculating the widths of a kick pulse and a brake pulse corresponding to the pulse width of the received NRZI signal, and generating write control signals for controlling write power values corresponding to the kick pulse and the brake pulse by the calculated widths to be output in a predetermined order; and a write signal generator for applying a write signal using a plurality of the write power values according to the write control signals output from the write control signal generator to the laser diode.

BRIEF DESCRIPTION OF THE DRAWINGS

The present invention will be described in more detail with reference to the accompanying drawings in which.

DETAILED DESCRIPTION OF THE PREFERRED EMBODIMENT

A preferred embodiment of the present invention will be described in more detail with reference to the accompanying drawings of FIGS. 3 through 5B.

Figure 1:
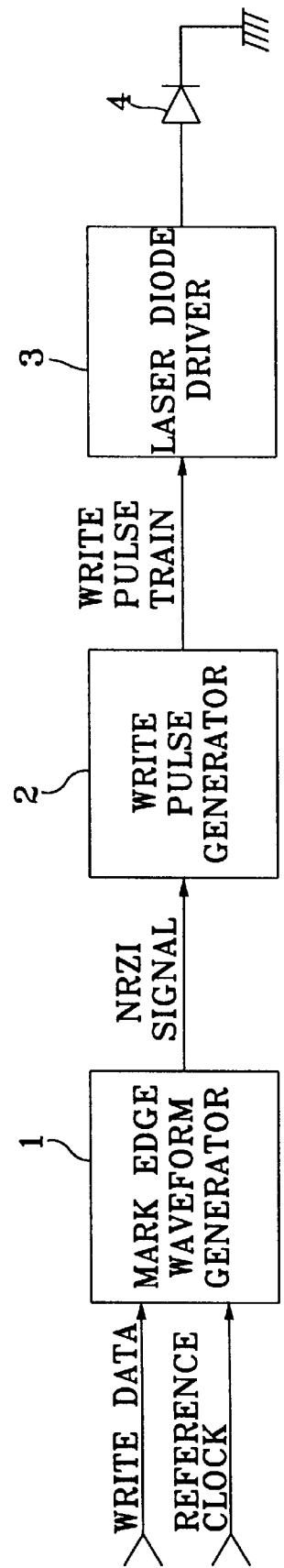
FIG. 1 is a block diagram of a conventional laser diode driving apparatus.
Figure 2A:
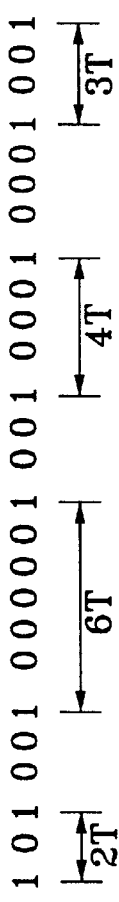
FIGS. 2A through 2F are waveform diagrams of the input/output signals of the respective elements of the conventional laser diode driving apparatus of FIG. 1.
Figure 2B:
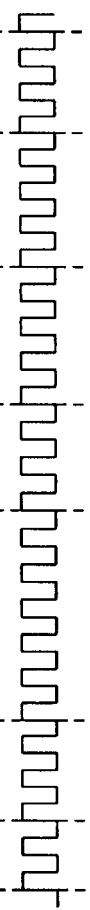
Figure 2C:
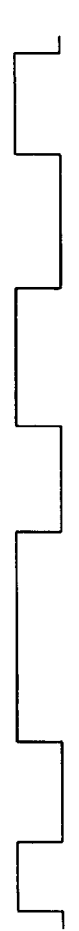
Figure 2D:
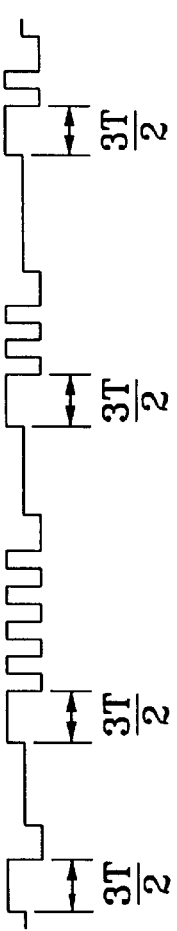
Figure 2E:
Figure 2F:
Figure 3:
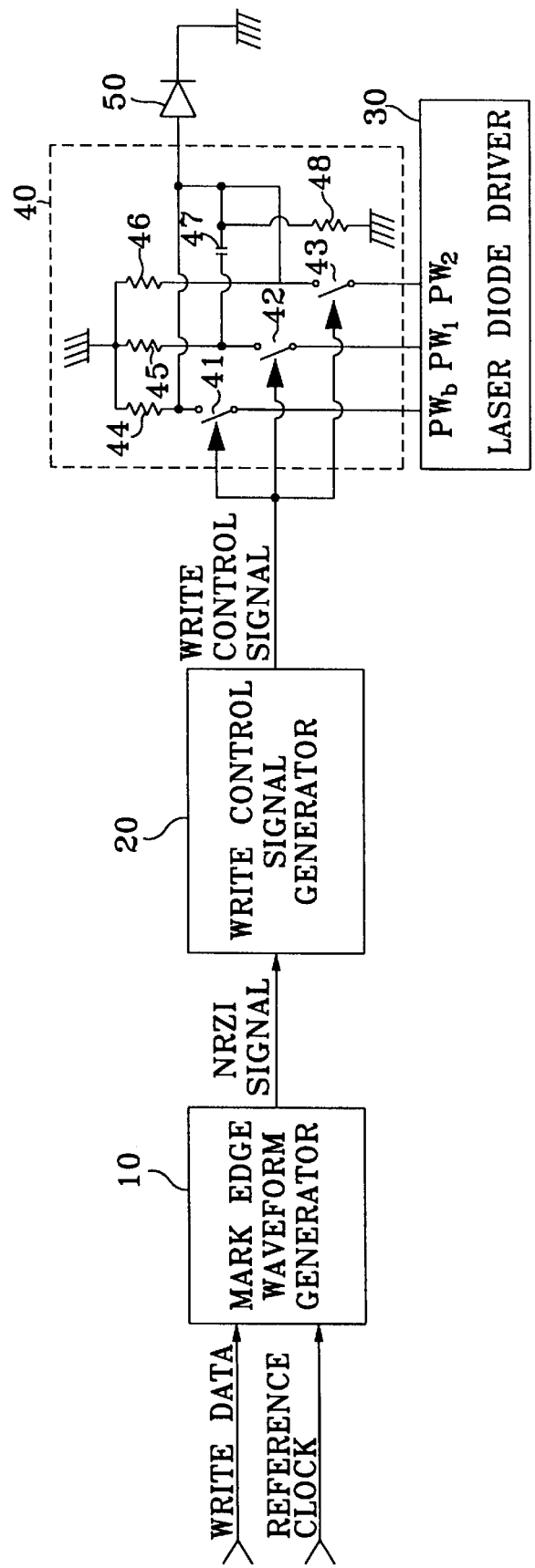
FIG. 3 shows the structure of a laser diode driving apparatus according to a preferred embodiment of the present invention.

FIG. 3 shows a laser diode driving apparatus according to a preferred embodiment of the present invention, wherein a mark edge waveform generator 10 receives write data and a reference clock, and generates a mark edge waveform, that is, a NRZI signal using the received write data and reference clock. A write control signal generator 20 generates a write control signal based on the pulse width of the NRZI signal, and supplies the generated write control signal to a write signal generator 40. A laser diode driver 30 supplies predetermined write power values $PW_b$, $PW_1$ and $PW_2$ to the write signal generator 40. The write signal generator 40 uses a write power value according to the write control signal, to output a kick pulse and a brake pulse. The write signal generator 40 includes switches 41, 42 and 43 for supplying or interrupting the write power values $PW_b$, $PW_1$ and $PW_2$ supplied from the laser diode driver 30 to a laser diode 50, individually. Switches 41, 42 and 43 are controlled to turn on or off by the write control signal supplied from the write control signal generator 20. Resistors 44, 45 and 46 individually connected to the switches 41, 42 and 43 are grounded via a common ground terminal. The switch 42 is connected to a capacitor 47 and a resistor 48 for changing the write power value $PW_1$ applied to the laser diode 50 into a differential attenuated waveform.

The operation of the apparatus having the above structure will be described in detail with reference to FIGS. 4A through 5.

Figure 4A:
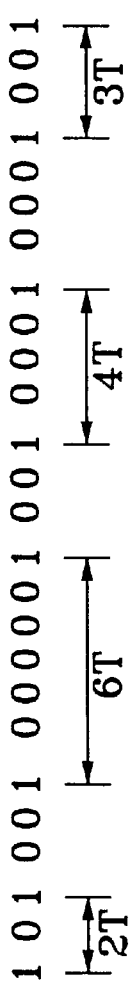
FIGS. 4A through 4F are waveform diagrams of the input/output signals of the respective elements of FIG. 3.
Figure 4B:
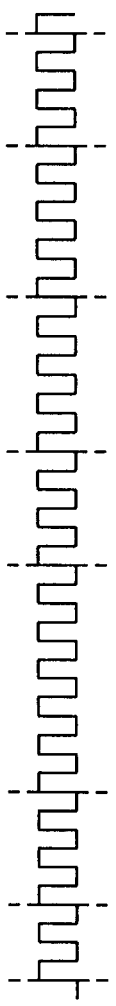
Figure 4C:

The mark edge waveform generator 10 receives the write data of FIG. 4A and the reference clock of FIG. 4B, from which a NRZI signal is generated as shown in FIG. 4C. The write control signal generator 20 receives the NRZI signal from the mark edge waveform generator 10, calculates the widths of a kick pulse and a brake pulse corresponding to the pulse width nT of the NRZI signal, and generates a write control signal according to the calculation results. The widths of the kick pulse $\overline{T_k}$ and the brake pulse $\overline{T_b}$ are calculated by the following equations (1) and (2).

$$\overline{T_k} = \frac{(2n-1)}{2}T \qquad (1)$$

$$\overline{T_b} = T \qquad (2)$$

Figure 5A:
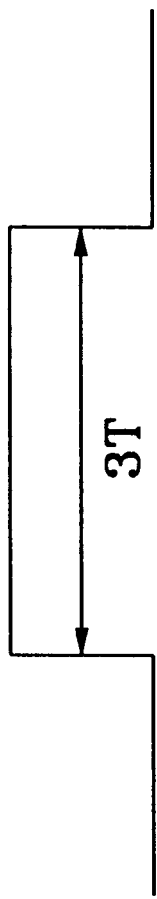
FIGS. 5A and 5B are waveform diagrams illustrating a method for producing a write pulse of an attenuated waveform using a NRZI signal.

For example, if the pulse width of the NRZI signal is 3T as shown in FIG. 5A, the width of the kick pulse is 5T/2 and the width of the brake pulse is T irrespective of the pulse width of the NRZI signal, according to the above equations (1) and (2).

Figure 5B:
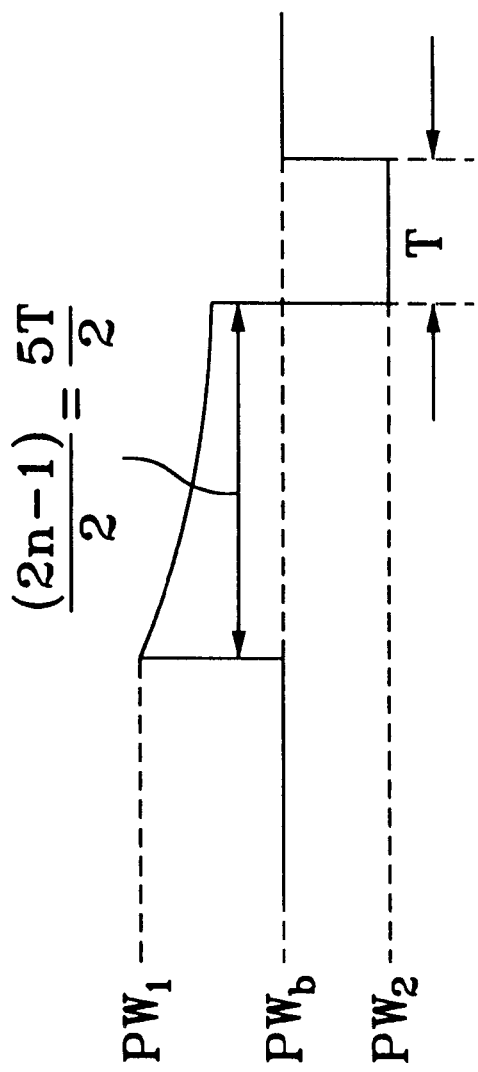

The write control signal generator 20 generates a first write control signal to turn on the switch 42 at a rising edge of the received NRZI signal, and continuously maintains the first write control signal during the width of the kick pulse calculated by the above equations (1) and (2), for example, during 5T/2 in the case when the pulse width of the NRZI signal is 3T. When the switch 42 is turned on by the first write control signal, the write power value $PW_1$ supplied from the laser diode driver 30 is applied to the laser diode 50. As shown in FIG. 5B, the write power value $PW_1$ applied to the laser diode 50 is differentiated by a capacitor 47 and a resistor 48 to form an attenuation slope. Here, the capacitor 47 and the resistor 48 are pre-set to the values satisfying the attenuation slope according to the following equation (3).

$$\text{Attenuation slope} = \frac{1}{1440} \times R \times PW_1 \qquad (3)$$

Figure 4D:
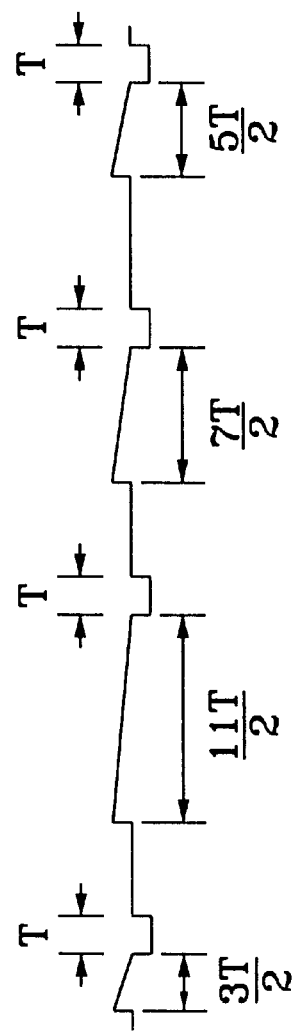
Figure 4E:
Figure 4F:

Here, R is the reflectivity (%) of a disk for recording information and $PW_1$ denotes the write power value (mW). If the time of 5T/2 lapses, then the write control signal generator 20 generates a second write control signal to turn the switch 43 on, and maintains the second write control signal during the time of T. If the switch 43 of the write signal generator 40 is turned on by the second write control signal, then the write power value $PW_2$ is applied to the laser diode 50 for the time of T as shown in FIG. 5B. Then, the write control signal generator 30 generates a third write control signal to turn the switch 41 on, and maintains the third write control signal until the next rising edge of the NRZI signal is received. The write control signal generator 20 generates write control signals for turning the switches 41 through 43 in turn according to the pulse width of the NRZI signal in the same manner as the above procedure. FIG. 4D shows a waveform of the kick pulse and the brake pulse generated by the write signal generator 40 according to the supplied write control signals. If the write signal constituting the kick pulse and the brake pulse is supplied to the laser diode 50, then a write domain is formed as shown in FIG. 4E on the disk. FIG. 4F is a waveform diagram of the reproduced signal in which the data recorded on the disk is detected using the laser diode 50.

As described above, the laser diode driving apparatus according to the present invention produces a simple write signal having an attenuated waveform to drive the laser diode. Accordingly, a write domain can be made to be close to a distinct oval. Also, distortion or swing of the reproduced signal can be minimized and a carrier-to-noise ratio can be improved. The laser diode driving apparatus can be so easily constructed so that the cost of the set does not increase.

While only certain embodiments of the invention have been specifically described herein, it will apparent that numerous modifications may be made thereto without departing from the spirit and scope of the invention.

What is claimed is:

1. A laser diode driving apparatus using a non-return-to-zero-inverted (NRZI) signal of write data, the laser diode driving apparatus comprising:

a laser diode for emitting laser light on an optical disk according to a write signal to record data thereon;

a laser diode driver for generating a predetermined plurality of different write power values each;

a write control signal generator for calculating widths of a kick pulse and a brake pulse corresponding to a pulse width of a received NRZI signal, and generating write control signals in a predetermined order for controlling write power values corresponding to the calculated widths of the kick pulse and the brake pulse; and a write signal generator for supplying a write signal to the laser diode using a plurality of the write power values according to the write control signals generated by the write control signal generator.

2. The laser diode driving apparatus according to claim 1, wherein said write control signal generator calculates the widths of the kick pulse $\overline{T_k}$ and the brake pulse $\overline{T_b}$ by the following equations when the pulse width of the NRZI signal is nT in which n is an integer, $$\overline{T_k} = \frac{(2n-1)}{2}T,$$

$$\overline{T_b} = T.$$

3. The laser diode driving apparatus according to claim 1, wherein said write signal generator generates a write power value corresponding to a level of the kick pulse among the plurality of the write power values and then generates a write power value corresponding to the level of the brake pulse.

4. The laser diode driving apparatus according to claim 1, wherein said write signal generator comprises:

a plurality of switches for supplying or interrupting the write power values output from said laser diode driver individually to said laser diode; and a differentiation circuit for differentiating the write power value corresponding to a level of the kick pulse.

5. The laser diode driving apparatus according to claim 4, wherein said differentiation circuit comprises a capacitor and a resistor.

6. The laser diode driving apparatus according to claim 5, wherein said capacitor and said resistor are pre-set to values satisfying an attenuation slope according to the following equation, $$\text{Attenuation slope} = \frac{1}{1440} \times R \times PW_1,$$

wherein R is the reflectivity of the optical disk and $PW_1$ denotes a write power value (mW).

* * * * *